Figure 2:
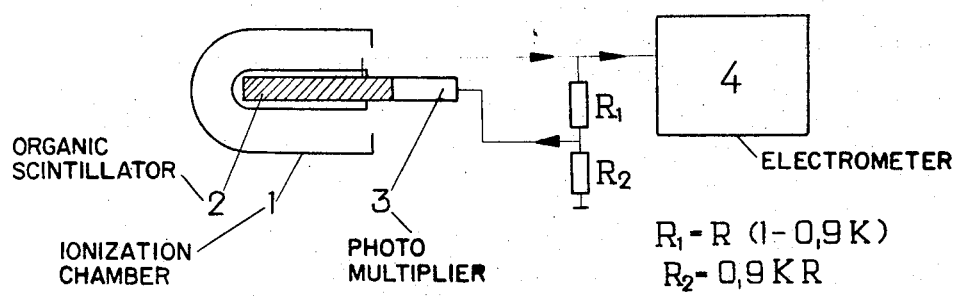

United States Patent [19]
Pszona

[11] 3,729,631
[45] Apr. 24, 1973

[54] METHOD AND APPARATUS FOR THE MEASUREMENT OF MIXED GAMMA-NEUTRON RADIATION DOSE EQUIVALENT

[76] Inventor: Stanislaw Pszona, Paxinskiego 1A-9, Warszawa, Anin, Poland

[22] Filed: May 22, 1970

[21] Appl. No.: 39,717

Related U.S. Application Data

[63] Continuation-in-part of Ser. No. 691,767, Dec. 19, 1967, abandoned.

[52] U.S. Cl. .........250/83.1, 250/71.5 R, 250/83.6 R
[51] Int. Cl. ............G01t 3/00, G01t 1/18, G01t 1/20
[58] Field of Search .......................250/83.1, 83.6 R, 250/83.3, 71.5, 83.6 F

[56] References Cited

UNITED STATES PATENTS

| | | | |
|---|---|---|---|
| 3,290,500 | 12/1966 | Bokhari et al. | 250/83.1 |
| 3,566,118 | 2/1971 | Peters | 250/83.1 |

*Primary Examiner*—Archie R. Borchelt
*Attorney*—Irvin A. Lavine

[57] ABSTRACT

A method and apparatus for measuring mixed gamma-neutron dose equivalent by determining a current difference between the output of an ionization chamber and a scintillator which latter preferably comprises an organic compound and has a photomultiplier tube operatively connected therewith.

3 Claims, 2 Drawing Figures

METHOD AND APPARATUS FOR THE MEASUREMENT OF MIXED GAMMA-NEUTRON RADIATION DOSE EQUIVALENT

This application is a Continuation-In-Part Application of Ser. No. 691,767, Filed Dec. 19, 1967, for: METHOD AND APPARATUS FOR THE MEASUREMENT OF MIXED GAMMA-NEUTRON RADIATION DOSE EQUIVALENT, and is now abandoned.

The present invention relates to a method for the measurement of the mixed gamma-neutron radiation dose equivalent and to an arrangement for the application of this method.

In consideration of radiation protection problems, the degree of radiation hazard is usually assessed by measuring the dose equivalent. The dose equivalent is defined in the Report of the RBE Committee to the International Commission on Radiological Protection and on Radiological Units and Measurements, published in Health Physics, Pergamon Press 1963, Volume 9, pages 357 through 386, printed in Northern Ireland; and in Recommendations of the International Commission on Radiological Protection, ICRP Publication 4, Protection Against Electromagnetic Radiation Above 3MeV and Electrons, Neutrons and Protons, published for the International Commission on Radiological Protection by Pergamon Press, New York 1964:

$$DE = D(QF)(DF),$$

Where: $DE$ = Dose Equivalent $D$ = Absorbed Dose $QF$ = Quality Factor $DF$ = Dose Distribution Factor No method for assessing the dose distribution factor, $DF$, has been determined so far, and it is therefore assumed to be equal to unity.

The quality factor, $QF$, is a function of the linear energy transfer (LET) and substitutes the biological effectiveness into the radiation protection considerations.

Rem is the dose equivalent unit.

Measurement methods as hitherto used to determine the mixed radiation dose equivalent have been based on the use of individual instruments to determine radiation components, i.e., gamma radiation and the neutron radiation components. This method is today in use in all the nuclear research centers in the Soviet Union, United States, France, the German Federal Republic, Great Britain, and is based on the radiation detectors with the hydrogen content moderator; (Hankins type, Anderson type). Measurements of that type are, nevertheless, rather burdensome and are subject to unavoidable errors.

In some of the American and English centers another type of detector built in the form of a double ionization chamber is being used.

The instrument based on this detector measures the radiation dose equivalent within a limited neutron energy range — from 100 keV up to 10 MeV. This is why additional measuring instruments must be used to measure the energy of neutrons below 100 keV and over 10 MeV.

The method of measurement based on the effect of columnar recombination in gases, as a method of the mixed radiation dose equivalent measurement, is under the initial stage of development. This method has been adopted so far in the CERN (Switzerland) and Brookhaven (USA) research centers.

The said method (called also recombination method) has a number of drawbacks, such as the limited dynamics of measurements confined to a 10 rem per hour range; limited applicability with regard to impulse fields' thick-walled construction due to pressurized gas filling; all of which lead to difficulties when conducting measurements in the low-energy electron, gamma-neutron radiation field.

The invention method of the direct mixed gamma-neutron radiation dose equivalent measurement is based on the measuring arrangement as shown in FIG. 2.

The detector unit comprises a cylindrical tissue-equivalent ionization chamber 1 and an organic scintillator 2. The organic scintillator and a photo multiplier 3 form a scintillation counter operating within the required current range. Constructionally, the organic scintillator has been placed inside the internal electrode of the ionization chamber. The electrometer 4 is used to measure the difference of voltages, produced in the specially-selected circuit of resistors, at the input of this meter.

The resistors $R_1$ and $R_2$ are connected in series. The resistor $R_1$ is connected between the internal electrode of the ionization chamber and the photomultiplier tube 3. The resistor $R_1 = (1 - 0.9K)R$ and the resistor $R_2 = 0.9KR$. The reason for choosing these values for $R_1$ and $R_2$ will be evidenced hereafter.

The discussed method of dose-equivalent measurement utilizes the discovered linear relation existing between the ratio of current of a scintillation counter $I_f$ readings with regard to the absorbed dose rate $P$ — and the radiation quality factor $QF$.

The discovered relation is derived from empirical data of a scintillation counter response in a gamma-neutron radiation field which is shown in FIG. 2 and can be approximated. This relation is shown in FIG. 2 and is expressed by the following equation:

$$QF = 10(1 - 0.9K I_f/P)$$

where $K$ = constant which normalizes the ratio $I_f/P$ )
where $K$ = constant which normalizes the ratio $I_f/P$ 1 for gamma-rays and where $I_f/P$ = the efficiency of a scintillation detector.

Since the absorbed dose rate $P$ of the radiation is correlated with the ionization chamber current $I_k$ as follows:

$$P = aI_k$$

where $a$ = constant depending on ionization chamber construction, the dose equivalent rate:

$$DE = QF \times P = (I_k - 0.9KI_f) 10 a$$

Figure 1:
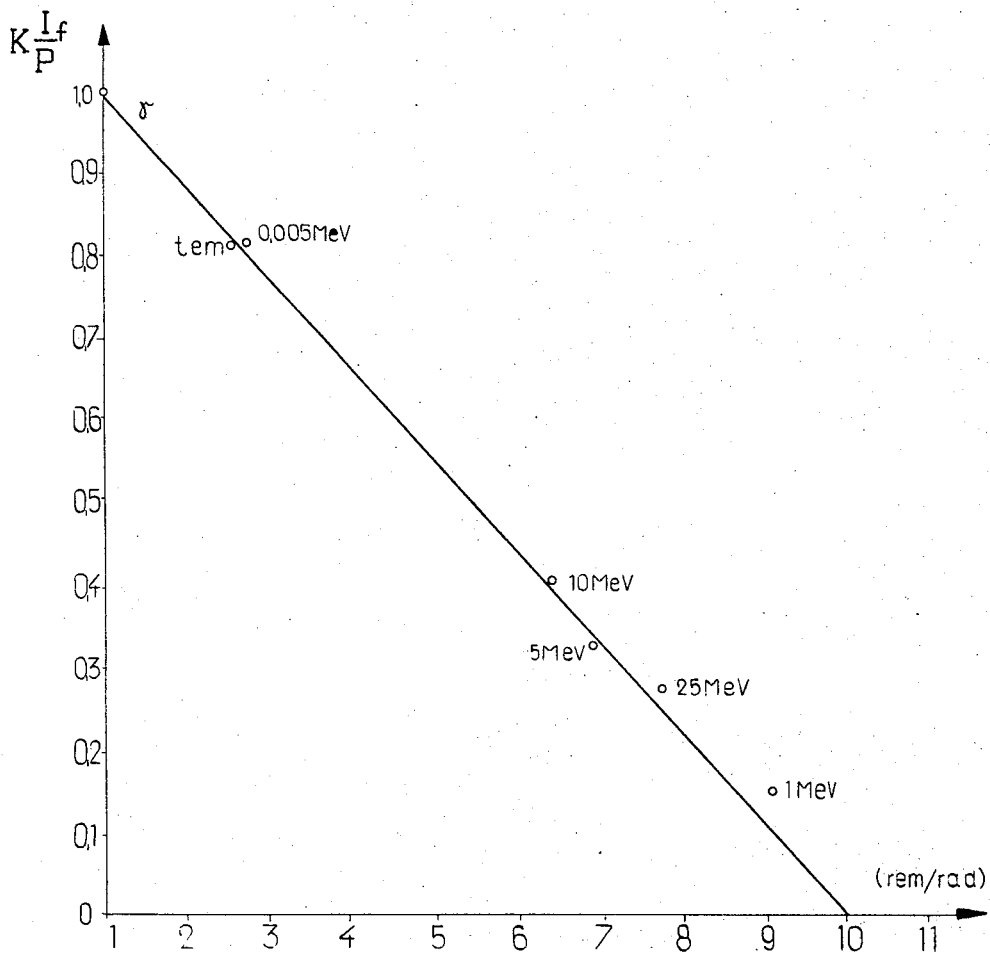

According to this equation, the dose equivalent rate is proportional to the difference of the ionization chamber current and a part of the scintillation counter current. The dose equivalent rate measurement may be accomplished by an adequate selection of the electrometer input resistance as shown in FIG. 1. The result of the connection thus implemented is the direct measurement of the dose equivalent rate. The application range of the invention method extends to the mixed neutron-gamma radiation covering neutrons ranging from the thermal energy neutrons to the fast and relativistic neutrons inclusively, in any desired composition.

The essential feature of the method of measurement of the dose equivalent rate ($D \cdot E$) of a mixed radiation is the fact as discovered by the inventor of the existence of a connection between the ratio of the scintillator of this counter and the radiation quality factor ($QF$).

Since the organic scintillator, as used by the inventor, is equivalent (with regard to the ionization radiation interaction) to the "standard tissue," the absorbed dose rate $P$ equals the dose rate absorbed in the standard tissue.

This dependence has been plotted in FIG. 1 with $K I_f/P$ on the vertical axis and $QF$ on the horizontal axis and expressed by the equation:

$$QF = 10(1 - 0.9 K I_f/P) \qquad (1)$$

Starting from the dependence thus found, a method of measurement of the dose equivalent rate $D \cdot E$ has been based thereupon.

The dose equivalent rate $D \cdot E = P \, QF$, thus, the equation (1) can be transformed by multiplying both members by $P$, in result of which we obtain:

$$P \, QF = 10(P - 0.9 K I_f) = D \cdot E \ldots \qquad (2)$$

Since the absorbed dose rate $P$ can be measured by a generally known method of ionization chamber built of material being equivalent to "standard tissue," by measurement of the current $I_k$ flowing through this chamber, or therefore $$P = a I_k, a = \text{constant} \qquad$$

If we now substitute in the equation (1) $P$ by $aI_k$, we obtain:

$$QF = 10(1 - 0.9 K' I_f/I_k) \ldots \qquad (1)'$$

or, the linear dependence between $I_f/I_k$ and the quality factor $QF \ldots$

If in the equation (2) we insert instead of $P$, $aI_k$, then after transformations we obtain:

$$D \cdot E = 10a(I_k - 0.9 K' I_f) \ldots \qquad (3)$$

The equation (3) can in practice be realized by employing two detectors: a scintillation counter with an organic detector and a tissue equivalent ionization chamber, by measuring the difference ($I_k - 0.9 K' I_f$) of their output currents.

It should be noted that for the sake of correct measurement of $D \cdot E$ the condition according to formula (1)' must be fulfilled.

The explanation of the circuit given in FIG. 2 is the following:

The current $I_k$ flows through $R_1$ and $R_2$ causing a voltage drop $Uk = I_k(R_1 + R_2) = I_k [R(1-0.9K'R) + 0.9K'R] = I_k R$.

The current $I_f$ flows through $R_2$ causing a voltage drop $$U_f = I_f \cdot 0.9 K' R$$

Since the polarization of the current $I_f$ is opposite to the current direction $I_k$, the voltage of the terminals of the circuit then $$U = U_k - U_f = I_k R - I_f \cdot 0.9 K' R = R(I_k - 0.9 K' I_f).$$

As it is shown, the voltage at the circuit output includes the expression in brackets from the equation (3).

Changes in the method of reading electrometer indications permit the quality factor $QF$ of the mixed radiation to be determined.

The proposed method of measurement is significant because of a number of additional advantages, such as: strong radiation $QF$/ readings dependence, easy adjustment of sensitivity in both detectors by changing the photo multiplier amplification, unlimited range of measurement as regards high dose rate, operation in high impulse fields, and the possibility of using thin-walled constructions depending on the measuring tasks.

This method shall be of special use in the fields of radiation of nuclear reactors, accelerators, and in other types of application fields where neutron sources will be involved. As such, it may be used in the form of portable or stationary equipment.

What is claimed is:

1. Apparatus for measuring a mixed gamma-neutron dose equivalent comprising:
   a. an ionization chamber constructed of a tissue equivalent material and having an output means;
   b. a scintillation detector, said scintillation detector being made out of organic material and said scintillation detector being mounted in said ionization chamber;
   c. a photomultiplier tube in operative relation to said scintillation detector and having output means;
   d. and means for measuring the difference of outputs from said photomultiplier tube and said ionization chamber whereby said measured difference is utilized to provide a measure of the dose equivalent rate due to the linear relationship between the ratio of the scintillation counter current to the ionization chamber current and the quality factor.

2. Apparatus for measuring a mixed gamma-neutron dose equivalent comprising:
   a. an ionization chamber;
   b. a scintillation detector in said ionization chamber;
   c. a photomultiplier tube in operative relation to said scintillation detector and having output means;
   d. and means for measuring the difference of outputs from said photomultiplier tube and said ionization chamber, said means comprising a first and second resistor connected in series, said first resistor having one of its ends connected to the output of said ionization chamber and its other end connected to said output means of said photomultiplier tube whereby the linear relation between the scintillation counter current and the ionization chamber is utilized to provide a measure of dose equivalent rate.

3. A method of measuring the dose equivalent in a mixed gamma-neutron radiation environment comprising;
   a. generating an output proportional to the absorbed dose rate of radiation;

b. generating an output linearly proportional to the quality factor of radiation, and
c. measuring the difference between said outputs.

* * * * *